United States Patent [19]

Park et al.

[11] 4,232,098

[45] Nov. 4, 1980

[54] SODIUM-SULFUR CELL COMPONENT PROTECTED BY A HIGH CHROMIUM ALLOY AND METHOD FOR FORMING

[75] Inventors: Dong-Sil Park, Schenectady; Debajyoti Chatterji, Latham; Manfred W. Breiter, Schenectady, all of N.Y.

[73] Assignee: Electric Power Research Institute, Inc., Palo Alto, Calif.

[21] Appl. No.: 889,046

[22] Filed: Mar. 22, 1978

[51] Int. Cl.³ ............... H01M 10/39; B32B 15/18; B05D 7/22

[52] U.S. Cl. .................................. 429/104; 427/237; 428/667

[58] Field of Search ............... 429/104; 427/237, 252, 427/253; 428/667

[56] References Cited

U.S. PATENT DOCUMENTS

| | | | |
|---|---|---|---|
| 3,589,927 | 6/1971 | Holker et al. | 428/667 |
| 3,959,013 | 5/1976 | Briter | 429/104 |
| 4,037,027 | 7/1977 | Desplanches et al. | 429/104 |
| 4,148,936 | 4/1979 | Grisik et al. | 428/667 |

FOREIGN PATENT DOCUMENTS 1455031  11/1976  United Kingdom ............ 429/104

OTHER PUBLICATIONS

A. H. Sulley, Chromium, Butterworth Scientific Publication, London, 1975, pp. 197-222.
Samuel, R. L. and Lockington, N. A., Metal Treatment 18(1951), pp. 440-444 and 495-506.

*Primary Examiner*—Donald L. Walton
*Attorney, Agent, or Firm*—Flehr, Hohbach, Test, Albritton & Herbert

[57] ABSTRACT

A corrosion resistant contiguous duplex chromium-carbon-iron alloy layer bonded to a steel and other similar ferrocarbon substrate for use as a cell casing for a sodium-sulfur cell. The outer layer includes in excess of 60 weight % chromium. The duplex layer is formed by pack chromizing in a pack of chromium and ammonium halide at elevated temperatures in hydrogen or inert gas atmosphere.

15 Claims, 5 Drawing Figures

U.S. Patent  Nov. 4, 1980  Sheet 1 of 2  4,232,098
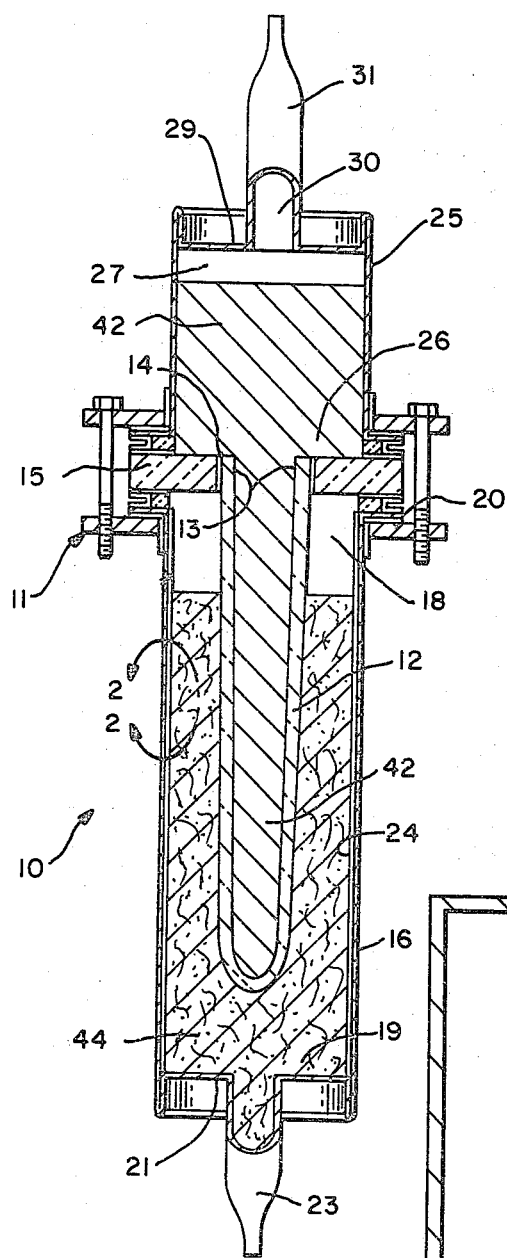
FIG. — 1
FIG. — 2
FIG. — 3

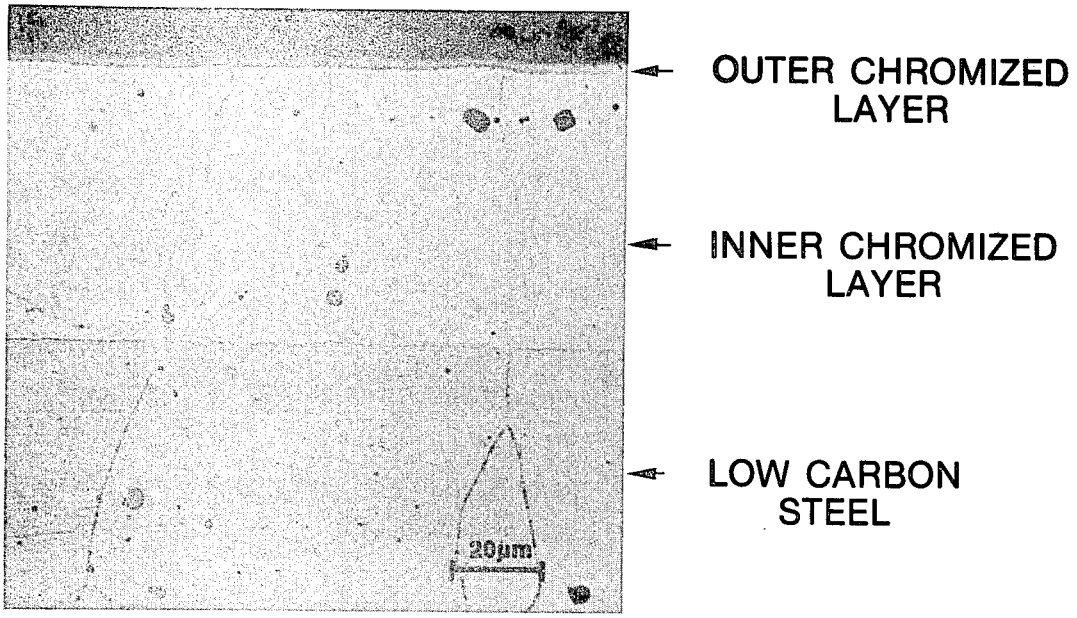
FIG.—4
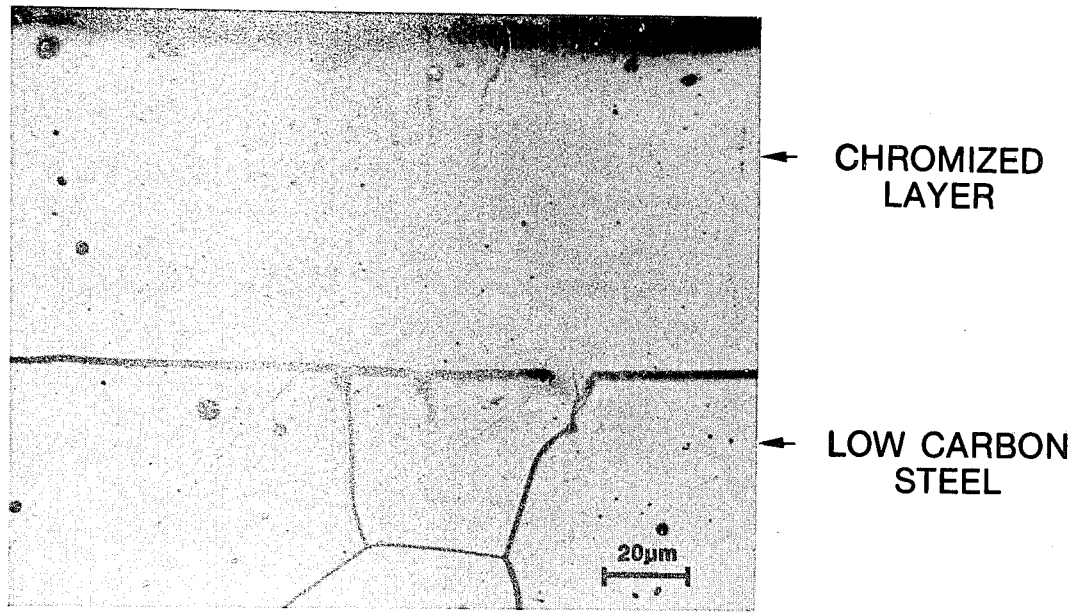
FIG.—5

SODIUM-SULFUR CELL COMPONENT PROTECTED BY A HIGH CHROMIUM ALLOY AND METHOD FOR FORMING

BACKGROUND OF THE INVENTION

The present invention relates to the protection of a ferrocarbon substrate with a corrosion resistant coating for use as a cell casing or other component in a sodium-sulfur cell.

The cell casing of a sodium-sulfur cell, especially the casing for the sulfur compartment, is subject to severe corrosive attack. Relatively inexpensive carbon steels cannot be employed as the casing for the sulfur compartment. They form metal sulfide scales which lead to extensive physical degradation and contamination of the sulfur/sodium polysulfide melt under cycling. This interferes with efficient cell operation and causes cell capacity losses, cell resistance increases and degradation of the electrolyte.

Breiter U.S. Pat. No. 3,959,013 discloses the use of a sulfur casing portion of metal, including steel, by providing a corrosion resistant and electronically conducting layer to adhere to its inner surface. The disclosed layer is formed of molybdenum or graphite by plasma spraying. In U.S. Pat. No. 4,048,390, an iron alloy is coated with aluminum by pack aluminiding.

Corrosion protective layers have been formed on substrate metals for a variety of uses other than the corrosive environment of a component for a sodium-sulfur cell. For example, carbon steel containers have been chromized by a variety of processes including chromium diffusion by pack chromizing for applications such as high temperature turbine blades. One process known as the D.A.L. process, is described in Samuel, R. L. and Lockington, N. A., *Metal Treatm.* 18 (1951) 407, 440, 495. In this process, ammonium iodide is packed with ferrochromium and kaolin powder to form a chromium-carbon-iron alloy layer. Other procedures such as the BDS process have also been employed in a diffusion process for forming a chromium alloy. There, a mixture of ferrochromium and broken pieces of ceramic are heated in a retort with circulating hydrogen chloride gas. The hydrogen chloride reacts with the ferro-chromium to form chromous chloride which is absorbed in the ceramic. Thereafter, the chromous chloride is volatilized and chromizes the article by replacement and reduction reactions. This procedure is described in A. H. Sulley, *Chromium,* Butterworth Scientific Publication, London, (1974), 197–199.

SUMMARY OF THE INVENTION AND OBJECTS

In accordance with the present invention, an improved corrosion resistant component (e.g. casing) of a sodium-sulfur cell is provided with a steel and other similar ferrocarbon substrate, e.g., mild steel, and protected by a very high chromium alloy layer (60% by weight or more) directly bonded to the substrate. The chromium alloy layer preferably is in duplex form with the high chromium content in the outer layer which is particularly resistant to the highly corrosive atmosphere of cycling in the sodium-sulfur cell.

In general, it is an object of the invention to provide an improved corrosion resistant component, particularly a cell casing, for a sodium-sulfur cell.

It is a further object of the invention to provide a component of the foregoing type with a relatively inexpensive steel and other similar ferrocarbon substrate coated with a highly corrosion resistant layer.

It is another object of the invention to provide a method for forming a corrosion resistant surface layer which is particularly effective for use as a component in a sodium-sulfur cell.

Further objects and features of the invention will be apparent from the following description of a preferred embodiment taken in conjunction with the accompanying drawings.

BRIEF DESCRIPTION OF THE DRAWINGS

FIG. 1 is an elevation section view of a sodium-sulfur cell including casing according to the invention.

FIG. 2 is an enlarged schematic section view of an interior wall portion of the sodium-sulfur cell casing taken in region 2—2 of FIG. 1 according to the invention.

FIG. 3 is a schematic view of apparatus for forming the alloy of the invention.

FIGS. 4 and 5 are optical photomicrographs of low carbon steel substrates with a chromized duplex layer and a monolayer, respectively, bonded to its surface.

DETAILED DESCRIPTION OF THE PREFERRED EMBODIMENTS

A sodium-sulfur cell 10 illustrated in FIG. 1 is characterized by a hermetic seal assembly 11 such as illustrated in U.S. Pat. No. 3,959,013.

An inner casing 12 of a solid sodium ion conductive material formed at one open end 13 is sealed by means of a glass seal 14 to a ceramic ring 15.

A metallic cathode casing portion or container 16 suitably formed of low carbon steel provides a tubular container with opposite open ends 18, 19 and a flange 20 at end 18 to surround inner casing 12 in spaced relation thereto. A removable closure 21 fits into the open end 19 of container 16 formed with a fill tube 23 secured to closure 21. Tube 23 forms a suitable flow passage connected to the interior of container 16. A metallic anode casing portion 25 formed of carbon steel includes opposite end openings 26, 27. Portion 25 is secured to assembly 11 as described in the last named patent. The upper end opening 27 is plugged by means of the removable closure 29 formed in a manner similar to closure 21 whereby a fill tube 31 is connected to a flow passage 30.

Sodium metal 42 disposed within casing 12 and casing 25 serves to form an anode. A cathode 44 of an electrically conductive material containing sulfur is disposed within cathode casing container 16 in contact with the outer wall of casing 12 and the inner wall of container 16.

The present invention relates to forming a low cost sulfur-corrosion resistant component for the cell, particularly container 16. This component is subjected to a highly corrosive environment. It has been found that a ferrocarbon substrate such as inexpensive carbon steel can be coated with a very high chromium alloy layer (60% by weight or more) to provide excellent corrosion protection under repeated cycling. Preferably, this layer is in duplex form. If desired, an iron-chromium alloy such as stainless steel may be employed as the ferrocarbon substrate with the deposition of a similar high chromium coating.

As defined herein, the "duplex" chromium alloy layer includes a relatively thin outer exposed surface of a chromium-carbon-iron alloy of high chromium content (at least 60 weight % and generally about 80 weight % or more) directly bonded to an inner continuous, homogenous chromium-carbon-iron alloy layer of lower chromium content (e.g. less than 50 weight %). The duplex layer is bonded in direct contact with the substrate. Such high chromium duplex layer is characterized by a grey color (In contrast, a silvery white color is indicative of a monolayer of lower chromium content.)

As defined herein, the term "chromium-iron-carbon alloy" layer refers to a solid solution of the specified elements. The chromium component may be in elemental form or combined into compounds with other elements in the substrate. For a steel substrate, such compounds include chromium carbides, to a major extent, and chromium nitrides, to a lesser extent. The total chromium content referred to is the combination of chromium in all forms.

A preferred method for forming the high chromium alloy layer is to totally submerge the steel or other similar ferrocarbon substrate in a solid particle pack of a chromium source and a halide activator, preferably ammonium chloride or bromide, and then to chromize at elevated temperatures. During this process, chromium halide is generated under conditions to diffuse the chromium in the substrate to form a duplex layer of contiguous outer and inner chromium-carbon-iron alloy layers, the latter one being bonded directly to the substrate. It is preferable to flow an inert gas such as argon or hydrogen through the system to remove generated gases.

It is believed that chromium deposit occurs in the above process by three major reactions. In a first "exchange" reaction chromium halide reacts with the iron in the ferrocarbon to deposit chromium and form iron halide. In a second "reduction" reaction, chromium halide is reduced by hydrogen and deposits chromium. In a third "dissociation" reaction, chromium halide is dissociated thermally and chromium is deposited.

A suitable chromizing pack includes 10-60 weight % chromium powder (chromium source), about 2 weight % ammonium chloride, and 50-80 weight % alpha-alumina powder (filler). To avoid sintering of the chromium powder and for economy, it is preferable to employ below 50 weight % chromium powder. If desired, ferrochromium alloy may be substituted for chromium as the source.

Duplex chromized layers are obtained with any of ammonium halide activators. However, ammonium chloride and bromide are preferred activators because they form the duplex layer very reproducibly.

The vapor pressure of chromium halide increases with temperature, and varies depending upon the particular halide. The vapor pressure of the halide increases in the following order—fluoride, chloride, bromide and iodide.

Referring to FIG. 2, a duplex layer 50 is illustrated including an outer high chromium content layer 52 and an inner thicker lower chromium content layer 54 bonded to the ferrocarbon substrate 56, suitably a low carbon steel. The interfaces between the layers of the duplex layer and between the substrate 56 and alloy layer 54 are contiguous without intermediate boundary layers which tend to reduce the strength of the bond with the substrate. In addition, the layers are relatively continuous and so provide complete surface coverage to the substrate. The duplex alloy layer and the relative thickness of the two layer components is controlled by the parameters of the process.

It has been found that the composition of surface layer 52 is in excess of 60 weight % and generally about 80 weight % or more chromium, 5 weight % or less iron, about 10 weight % of carbon, 2-10 weight % of nitrogen, and 2 to 3 weight % aluminum with small amounts of other elements. In this layer, the chromium concentration remains almost constant, in addition to elemental chromium, chromium carbide forms a major phase and there is also a substantial amount of chromium nitride. The intermediate layer 54 includes a chromium content less than about 50 weight % with a typical composition on the order of 40 to as high as 50 weight % chromium, 25 to 35 weight % iron, 10 to 15 weight % carbon, and 2 to 3 weight % aluminum with small amounts of other elements. The chromium concentration in this layer decreases gradually with increasing depth from the surface.

Parameters which can affect the type of duplex layer which is formed are the temperature and time of chromizing. In general, a suitable temperature range is about 850°-1200° C. The preferred temperature is from 950°-1100° C. At temperatures in excess of 1150° C., it is possible that the outer layer will become too thin for effective protection. An illustration of the effect of temperature on the thickness of the inner chromized layer 54 is set forth in the following table in which an AISI 1010 low carbon steel is chromized in a pack comprising 40 weight % chromium, 58 weight % alumina, 2% ammonium chloride.

TABLE 1

| Chromizing Temperature (°C.) | Time (hours) | Thickness of Inner Chromizing Layer (microns) |
|---|---|---|
| 1000 | 3 | 10 |
| 1050 | 3 | 45 |
| 1100 | 3 | 90 |
| 1100 | 6 | 140 |

The chromium content in inner layer 54 in each instance was lower than 50%. Outer layer 52 had a thickness on the order of 5 microns and surface chromium content on the order of 80 weight %.

Another factor influencing the character of the duplex layer is the carbon content in the steel. An increase in the carbon content in the steel reduces the thickness of inner chromized layer 54. The conventional chromized layer on carbon steel usually consists of a single layer, which corresponds to the inner layer of the duplex chromized layer described in the present specification. Thus, in conventional applications, efforts have been made to suppress the effect of carbon. It has been found that while the inner layer is reduced in thickness, the outer layer is increased with increasing carbon content. As the outer duplex layer is essential for corrosion protection in sodium-sulfur cells, carbon content has a beneficial effect. The following table illustrates the effect of carbon content by chromizing at 1100° C. for 2 hours with ferrocarbon substrates of variable contents.

TABLE 2

| Carbon Content (weight %) | Thickness of Chromized Layer (microns) | |
|---|---|---|
| | Inner Layer | Outer Layer |
| 0.10 | 64 | 3.3 |

TABLE 2-continued

| Carbon Content (weight %) | Thickness of Chromized Layer (microns) | |
|---|---|---|
| | Inner Layer | Outer Layer |
| 0.15 | 22 | 6.6 |
| 0.20 | 10 | 8.4 |

It is believed that a high concentration of chromium halide adjacent to the steel and other similar ferrocarbon substrate contributes to a significant extent to the production of the duplex chromium alloy layer. Below the desired vapor pressure, only a monolayer of lower chromium content is formed which exhibits a silvery white appearance. At vapor pressures higher than this level, the outer high chromium layer begins to form but may be too thin to provide a desired corrosion protection. Thus, the vapor pressure should be sufficient to form an outer layer of the desired thickness, say 3-5 microns or more.

During the process, a variety of by-product gases are formed in addition to the chromium halides. It is necessary to vent these gases to avoid the danger of excessive pressure build-up. Furthermore, to avoid contamination of the pack from atmosphere, the heating process is done in hydrogen or an inert atmosphere.

An important factor in forming the desired duplex layer is the pack geometry. It has been found that the duplex layer is formed most consistently by providing a solid barrier over the pack and steel and other similar ferrocarbon substrate to inhibit loss of chromium halide vapor from the pack.

Referring to FIG. 3, one preferred pack geometry for forming the aforementioned barrier is schematically illustrated for chromizing the casing of a sodium sulfur cell. Casing 60 is totally submerged in chromizing pack 62 contained in stainless steel retort 64 surrounded by an enclosure 66 such as a box-type furnace. An inert gas or hydrogen is directed into inlet 68 to enclosure 66 and removed by outlet 70 from the enclosure. In the above configuration, the open cavity of casing 60 is disposed downwardly. In other words, the casing is inverted forming a dome. In this geometry, a duplex chromium alloy layer of grey color is repeatedly produced on the interior surface 60a of container 60 while the exterior surface 60b is chromized with a monolayer of relatively low chromium content and silvery white color. Similarly, coupons 72 submerged in the pack under the dome of container 60 are also chromized with a duplex layer.

In another preferred embodiment, not shown, a loose fitting solid barrier is placed over the top of the pack to slow the loss of chromium halide vapor. For example, a sheet of material such as stainless steel foil is placed over the top of the pack with its edges conforming to the walls of the retort but not sealed against the same so the gases are inhibited but not prevented from passing from the retort. In this embodiment, the casing with its opening faced either downwardly or upwardly is chromized with a duplex layer over essentially its entire surface. Similarly, coupons without an additional barrier such as interior walls of the casing of FIG. 3 are chromized in a duplex layer over essentially their entire surface.

In contrast, without a barrier of either of the foregoing types, repeatable duplex chromized layers are not formed. Thus, for example, where the open end of the casing faces upwardly and no additional barrier such as the stainless steel foil is placed over the top of the chromizing pack, duplex layers are not consistently formed.

Use of casings chromized with the duplex chromium layer of dull grey color as set forth above show excellent performance during cycling in a sodium-sulfur cell. The cell resistance increase during cycling is substantially lower than that of 347 stainless steel containers. After as long as six months of cycling in a cell, corrosion is characterized by a very thin uniform adherent scale. X-ray analysis illustrates that the adherent sulfide scale consists of $Cr_2S_3$. This is apparently due to the stability and very slow growth of $Cr_2S_3$.

In contrast to containers with a duplex chromized layer in accordance with the present invention, containers with a monolayer appear silvery white and generally correspond in corrosion behavior during cycling to 347 stainless steel containers. Such behavior is far better than that of carbon steel obtained by other methods such as chromium coating by plasma spraying. In this monolayer, the sulfide layer consists mostly of $FeS_2$ which is not as stable as $Cr_2S_3$ formed on the duplex layer for long-term corrosion protection.

A further disclosure of the nature of the present invention is provided by the following specific examples of the practice of the invention. It should be understood that the data disclosed serve only as examples and are not intended to limit the scope of the invention.

EXAMPLE 1

A low carbon steel casing and coupons were embedded in a chromium pack as illustrated in FIG. 3. The pack comprised 40% chromium, 2% ammonium chloride, and the balance alpha-alumina powder contained in a stainless steel retort. Chromizing was carried out at 1100° C. for 3 hours during which a stream of hydrogen gas was continuously passed through the reaction chamber.

The specific dimensions and amounts of the materials were as follows: stainless steel retort—2.75 inch I.D.×3.75 inch length; low carbon steel container—1.0 inch O.D.×0.035 inch wall×3 inch length (one end closed and the other with a small flange); low carbon steel coupons—0.375 inch×0.375 inch×0.065 inch; amount of pack powder—approximately 110 grams filled to 0.25 inch depth of the retort opening (corresponding to about 0.17 gram chromium per unit area of low carbon steel).

The coupons were grey-colored while the inner surface 60a of container 60 was uniformly grey-colored. The outer surface was of mixed appearance with a shiny metallic appearance. The weight gain of the three coupons was typically $12 \times 10^{-3}$ gm/cm$^2$. The chromized steel had a duplex chromized layer as illustrated in the optical photomicrograph of FIG. 4 with a thin outer layer and a thick inner layer.

Auger electron spectroscopy (AES) and electronmicroprobe analysis (EMA) illustrated that the outer duplex layer is far richer in chromium than the inner layer. Typically, the surface composition was as follows: about 80 weight % chromium, 5 weight % or less iron, 10 weight % carbon, 5-10 weight % nitrogen, 2-3 weight % aluminum and small amounts of other elements.

The corrosion behavior of the chromized steel container in a sodium-sulfur cell was as follows: a very thin uniform adherent corrosion scale was reproducably observed after as long as six months of cell tests. X-ray analysis illustrated that the adherent sulfide scale consists of $Cr_2S_3$.

COMPARATIVE EXAMPLE 2

The conditions of Example 1 were followed except that container 60 was inverted so that the open end faced upwardly.

The chromized coupons and container showed a silvery white appearance with the top coupon appearing shiny. The weight gain of the coupons were different depending on the location, e.g.—$4-8 \times 10^{-3}$ $gm/cm^2$ for the topmost coupon and $9-10 \times 10^{-3}$ $gm/cm^2$ for the bottommost coupon. Metallographic examinations illustrated that the chromized layer was a relatively thick monolayer as illustrated in the optical photomicrograph of FIG. 5. AES and EMA illustrated the following typical surface analysis: 40–50 weight % chromium, 25–35 weight % iron, 10–15 weight % carbon, 2–3 weight % aluminum, and small amounts of other elements.

Containers with a chromized monolayer produced as set forth in this example appear silvery white. The cell performance and corrosion behavior is similar to cells with 347 stainless steel with a sulfide scale consisting primarily of iron sulfide. Such scale is not as stable as the sulfide scale formed on the duplex layer for long-term corrosion protection. For example, one container illustrated a thickness of about 10 mil corrosion scale after cycling in a sodium-sulfur cell for about 2 months. During this time, the cell resistance increase was substantial.

EXAMPLE 3

The conditions of Example 1 were followed except that a cap with a small opening between the cap and retort was placed over the top of the retort. The opening relieved pressure in the retort while assisting retention of the chromium halide gas.

Chromizing results (appearance, microstructure and weight gain and corrosion test results) were similar to those of Example 1. The only noticable difference was that the outer surface of the container was uniformly grey colored in comparison to the mixed appearance in the outer surface in Example 2.

EXAMPLE 4

The conditions of Example 1 were followed with the exception that a thin foil of stainless steel was placed inside the retort to cover the top of the pack. The results were similar to that of Example 3.

What is claimed is:

1. An electrically conductive, corrosion resistant component for a sodium-sulfur cell comprising a ferrocarbon substrate and a non-porous chromium-iron-carbon duplex alloy surface layer chemically diffusion-bonded to the substrate, said duplex alloy surface layer comprising contiguous outer and inner layers, said outer layer containing in excess of about 60 weight % chromium, and said inner layer containing less than about 50 weight % chromium in direct contact with the substrate.

2. The component of claim 1 in which said ferrocarbon is steel.

3. The component of claim 2 in which said steel is a low carbon steel.

4. The component of claim 1 in the form of a cell casing in which said alloy layer is on the inner surface of the cell casing.

5. The component of claim 1 in which at least a portion of the chromium content of said alloy is in elemental form.

6. The component of claim 1 in which at least a portion of the chromium content of said alloy is in carbide form.

7. The method of claim 1 in which the temperature of diffusion is in a range from about 950° C. to about 1150° C.

8. A method for forming a corrosion resistant layer on a ferrocarbon substrate comprising pack chromizing said substrate by totally submerging it in a solid pack of a chromium source and a halide activator at an elevated temperature to generate chromium halide at sufficient vapor pressure to diffuse the chromium into said substrate to form a duplex chromium-carbon-iron alloy layer chemically diffusion bonded to said substrate, said duplex alloy layer comprising contiguous outer and inner layers, said outer layer containing in excess of about 60 weight % chromium, and said inner layer containing less than about 50 weight % chromium in direct contact with the substrate, the vapor pressure of chromium halide in said solid pack being maintained at a predetermined level to form said duplex layer by providing a solid barrier over said pack and ferrocarbon substrate to inhibit loss of chromium halide vapor from said pack.

9. The method of claim 8 in which the area of said ferrocarbon substrate to be chromized contains an open cavity at one end and said barrier is formed by disposing said substrate in said pack with said open end facing downwardly.

10. The method of claim 9 in which said substrate comprises a cell casing for a sodium-sulfur cell.

11. The method of claim 8 in which said barrier is formed by maintaining a lid on said pack during chromizing.

12. The method of claim 8 in which said process is carried out in hydrogen or an inert gas atmosphere.

13. The method of claim 8 in which said halide activator is selected from ammonium halides.

14. The method of claim 8 in which said ferrocarbon metal is a low carbon steel.

15. The product formed by the method of claim 8.

* * * * *